3,438,826
METHOD OF HEAT SEALING THE CONTAINER
EDGES OF PLASTIC FOAM MATERIAL BY
FLAME CONTACT
Hans Van Eikeren, Elm Grove, Wis., and Berthold L.
Weller, Deerfield, Ill., assignors to Kitchens of Sara
Lee, Inc., Deerfield, Ill., a corporation of Maryland
Filed Jan. 26, 1966, Ser. No. 523,062
Int. Cl. B65d 85/36; B29c 27/02, 24/00
U.S. Cl. 156—82                     8 Claims The present invention relates to the packaging of food or like materials and is, more particularly, concerned with the provision of an improved package and method of closing the same.

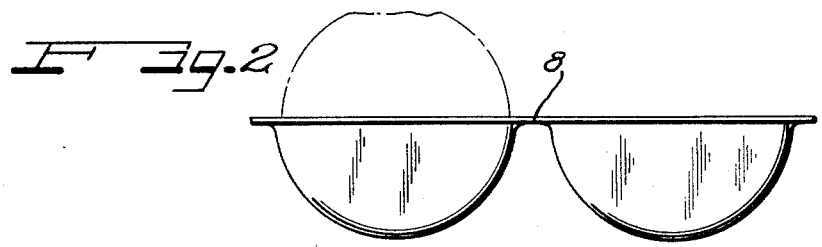
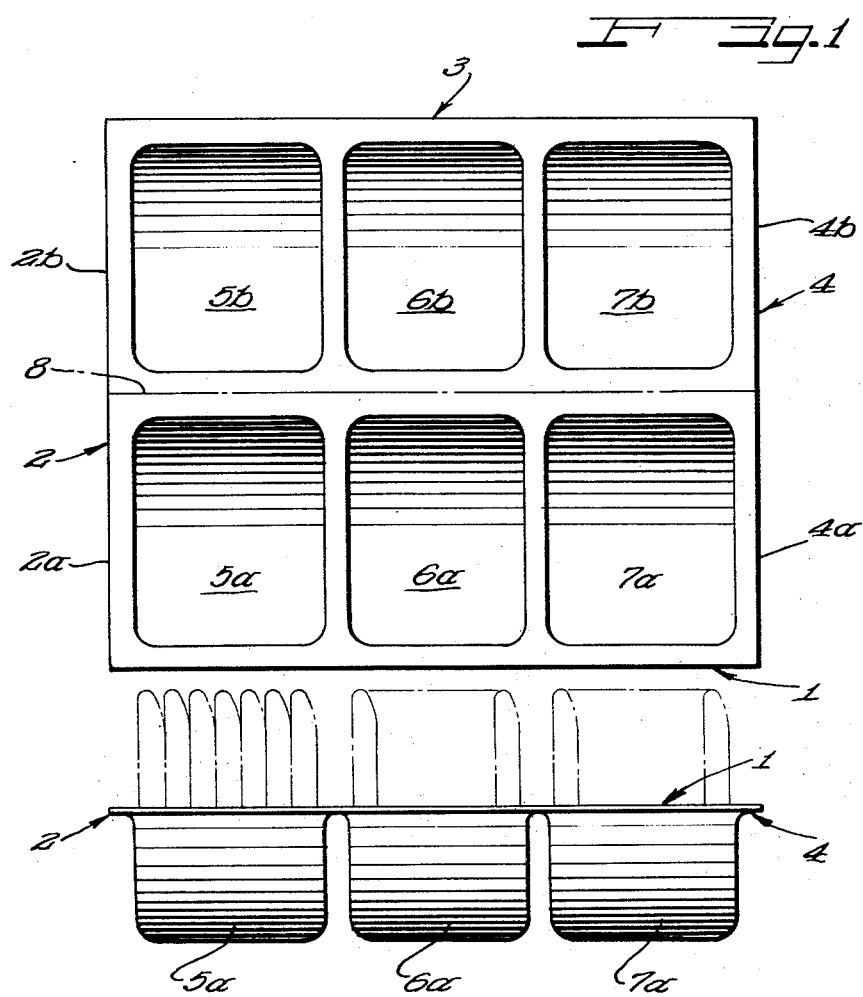
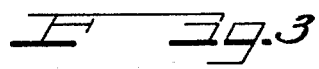
INVENTORS
Hans Van Eikeren
Berthold L. Weller

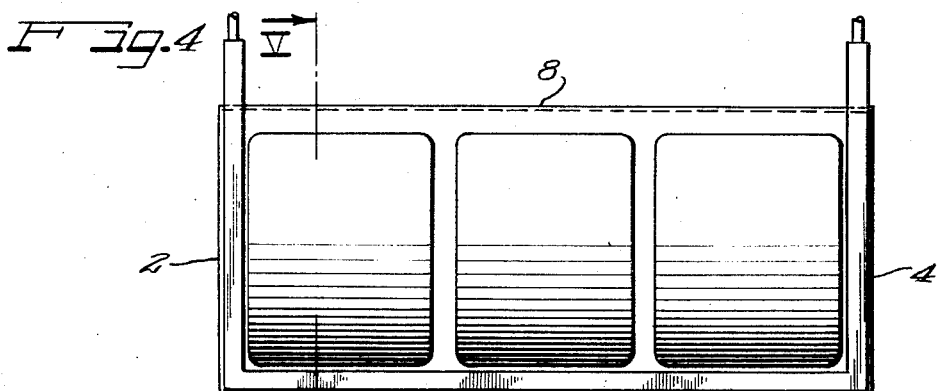
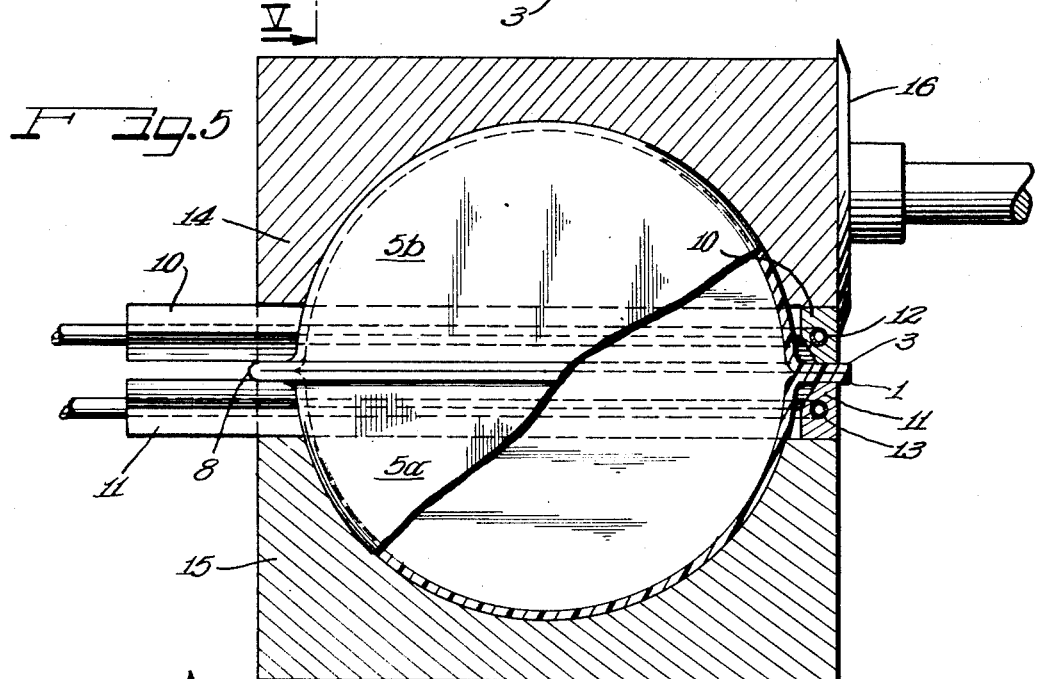
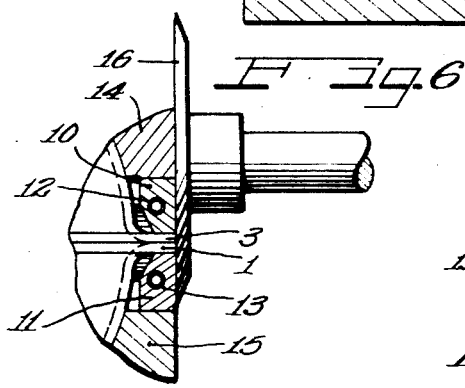
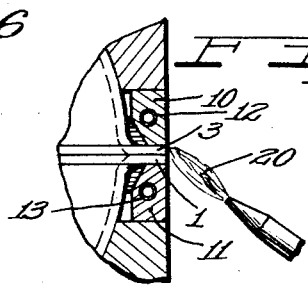
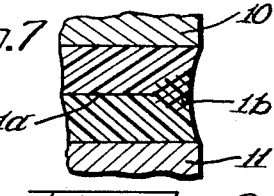

In the packaging of foods or the like, and for example, baked goods, it is desirable that inexpensive packages capable of adequately physically and environmentally protecting the packaged goods be provided. Many forms of plastic containers have been developed and utilized in the food industry for the marketing of such goods. To our knowledge, however, no inexpensive truly satisfactory package has yet been achieved for the complete protection of extremely fragile baked goods such as cookies or the like. In accordance with our invention, set out more particularly below, we provide a one-piece sheet of cellular, or vesicular, polystyrene plastic foam. This sheet is formed to provide at least one cup-shaped depression on each side of a longitudinally extending fold line. Upon placement of a food product or the like in the cavity on one side of the fold line, the sheet is folded upon the fold line to provide a closed container having a peripheral unsealed edge along three sides thereof. The container thus formed is then sealed in a novel manner to provide a novel frangibly sealed container capable of insulating the packaged goods against externally applied physical shock and temperature and humidity varations.

Polystyrene foam is considered extremely difficult to seal in a simple, efficient manner. Prior to our invention, no known means was available for quickly sealing simple food packages or the like. Prior techniques of sealing foam materials required mechanical clips, staples, and similar means which did not provide a uniform seal around the edge of the container and which, further, provided only a local, less substantial, fastening. Uniform heat sealing was not considered feasible due to the charring and high shrinkage characteristics of the material.

In accordance with our invention, heat sealing is satisfactorily accomplished. The cellular polystyrene foam package is clamped with its three unsealed peripheral edges firmly gripped between heat conductive clamping jaws. The portions of the edge projecting beyond the jaws is closely and cleanly sliced away along the exterior surface of the clamping jaws and heat is applied to the thus exposed face of the abutting polystyrene foam edges of the container. Due to the rapid heat withdrawal by the clamping members, and the application of heat to the limited facial area, no shrinkage or other damage occurs to the main body of the container while the edge of the container is sealed without charring along a moderately concave edge providing a completely closed container. We have found that the seal thus perfected is a strong one completely unlike any seals heretofore contemplated in connection with polystyrene foam.

It is, accordingly, an object of the present invention to provide a novel and substantially improved food container constructed of cellular foam polystyrene sheet material.

Another object of the present invention is to provide a novel method of sealing a container constructed of cellular foam material.

A feature of the invention resides in the clamping of a pair of abutting faces of polystyrene foam material, slicing the projecting areas of the material, and applying heat solely to the thus exposed surfaces.

Still a further feature of the invention is the provision of a novel container constructed of sheet polystyrene foam material, folded upon itself along one edge and heat-sealed along the remaining three edges.

Still other and further objects and features of the present invention will at once become apparent to those skilled in the art from a consideration of the herewith attached drawings and specification, wherein one embodiment of the present invention is shown by way of illustration only, and wherein:

FIGURE 1 is a plan view of a container formed from sheet polystyrene foam prior to the final folding thereof during the packaging operation;

FIGURE 2 is an end-elevational view of the container shown in FIGURE 1 as viewed from the right in FIGURE 1;

FIGURE 3 is a side-elevational view of the container shown in FIGURE 1 as viewed from below;

FIGURE 4 is a plan view of the container shown in FIGURE 1 after folding and packaging schematically shown in a fixture for sealing;

FIGURE 5 is a cross-sectional, side-elevational view of the sealing apparatus arranged for satisfactorily sealing the container in accordance with the principles of the present invention;

FIGURE 6 is a partial section generally as shown in FIGURE 5 and illustrating the slicing of the edges of the container prior to heat-sealing;

FIGURE 7 is a schematic illustration of the sealing operation after the slicing accomplished in FIGURE 6; and FIGURE 8 is an enlarged cross-sectional view of the sealed edge of the container constructed and sealed in accordance with the principles of the present invention.

As shown on the drawings:

As may be seen from a consideration of FIGURES 1, 2 and 3, the container of the present invention is preferably formed of a rectangular, flat sheet of cellular polystyrene foam material. This sheet has edges generally indicated at 1, 2, 3 and 4 and is provided, preferably by a sheet-forming method, with shaped receptacles 5a, 5b, 6a, 6b, 7a and 7b, the a and b receptacles being positioned on opposite sides of a generally longitudinally extending fold line 8. The fold line 8 is a slightly reduced thickness crease, preferably provide in the sheet during the forming of the receptacles. It will, of course, be obvious that various forms of products may be enclosed in this container, and the shape of the receptacles may vary. However, as shown in dotted lines in FIGURES 2 and 3 generally circular baked cookies may readily comprise the contained substance.

After placing the product in the positions generally as shown in the dotted lines in FIGURES 2 and 3, the container is folded along the crease 8 to a condition in which the receptacles 5a, 6a and 7a match with the receptacles 5b, 6b and 7b to provide generally cylindrical cavities. At the same time, the edge portions 2a, 2b, 4a, 4b, and 1, 3 overlie each other respectively to provide a closed, three-cavity container generally as shown in FIGURE 4 with the product positioned inside.

Sealing the container thus provided is accomplished by means of the application of heat. It has been found in the treatment of foam polystyrene, in accordance with prior teachings, that the substance is extremely sensitive to the application of concentrated heat. Upon the application of heat in any quantity to the material, it shrinks to such an extent as to completely lose its dimensional stability. Accordingly, it has heretofore been considered impossible to heat-seal a structure such as cellular foam polystyrene.

In accordance with the present invention, however, such seals have been successfully accomplished upon the application of heat, by controlling absolutely the application of heat. This is accomplished in accordance with the present invention through the utilization of clamping means having a high heat conductivity. A consideration of FIGURE 5 shows that the folded over, closed container is clamped between upper and lower clamps 10 and 11, respectively, such that the peripheral edges 2a, 2b, 4a, 4b, 1 and 3, respectively, are clamped between heat conducting members 10 and 11. The members 10 and 11 are preferably bored to provide for liquid coolant circulation, as at 12 and 13, respectively. At the same time, the container may be fully enclosed by an insulating cover formed by blocks 14 and 15, respectively, if desired. Upon the assembly of the package into the condition shown in FIGURE 5, between clamps 10 and 11, the peripheral edge extending beyond the confines of the clamp is sliced cleanly flush with the surface of the clamps by any conventional means. For example, a very satisfactory slicing means is provided by the rotary slicing knife 16 which is vertically movable downwardly into an interference relationship with the projecting edge, as shown in FIGURE 6. Upon completion of the traverse of the slicing means around the three unsealed sides of the container, comprising sides 2, 3 and 4 as shown in FIGURE 4, the peripheral edge of the foam polystyrene appears as illustrated in FIGURE 7.

Heat is applied as shown in the diagrammatic illustration of FIGURE 7, by the application of a flame 20 to the exposed, clean faces of the polystyrene at the peripheral edges thereof between the heat-conducting clamp portions 10 and 11. Due to the fact that the container edges do not project beyond the clamp portions 10 and 11 and the clamp portions conduct heat at a rapid rate, the polystyrene melts adjacent its interface, as indicated at 1a in FIGURE 8 to provide a welded, concave edge 1b. Further contraction of the material in a direction away from the flame 20 is prevented by the chilling action of the clamp portions 10 and 11. In the absence of this combination of peripheral edge chilling and relatively high application rate of heat, the entire joint is improperly secured an, further, experience has shown that charring occurs at the edges and physical deterioration of the overall container takes place.

It has been found as a result of sealing of foam polystyrene packages of the type above described, that a very clean, non-charred edge is provided. This is true due to the fact that the edge of the container is essentially self-quenching during the sealing operation. Although the application of heat to the polystyrene foam will cause the foam to retreat almost instantly if unprotected from the heat, the utilization of the cooled clamp members 10 and 11 has been found to eliminate this effect. The container thus formed has excellent shock protection characteristics and is readily opened for purposes of product consumption.

It will be apparent that variations may be made relative to the apparatus shown without departing from the scope of the novel features of the invention. For example, a radiant heater of the gas or electrical type may be used to heat the edges of the container, if desired. In view of such readily perceived variations, we intend that the scope of our invention be limited solely by the scope of the hereinafter appended claims.

We claim as our invention:

1. The method of heat-sealing a pair of adjacently positioned thin layers of substantially rigid polystyrene foam which comprises the steps of clamping adjacent surfaces between a pair of heat-conductive clamp elements, slicing the edges of the surfaces at the outer edge of the clamp elements, and applying heat to the thus sliced edges to heat seal said edges.

2. The method of sealing a pair of contacting surfaces of cellular foam plastic which comprises the steps of clamping said surfaces tightly together between a pair of heat-conductive clamp elements leaving a pair of projecting edges, slicing the edges at the edge of the clamp elements to thereby eliminate substantially all projection of said edges, and applying heat to the thus sliced edges to heat seal said edges.

3. The method of constructing a sealed container of cellular foam plastic which comprises folding the container about a median line to provide three remaining edges in abutting side-to-side relationship which comprises clamping the side-to-side surfaces into tight surface contact with each other between a pair of highly heat-conductive clamp elements, slicing the edges of the container back to the edge of the clamp elements leaving substantially no projecting container material extending beyond the clamp elements, and applying heat to the thus sliced edges around the three edges of the container to heat seal said edges.

4. The method of constructing a sealed container of cellular foam plastic which comprises folding the container about a median line to provide three remaining edges in abutting side-to-side relationship, which comprises clamping the side-to-side surfaces into tight surface contact with each other between a pair of highly heat-conductive clamp elements, slicing the edges of the container back to the edge of the clamp elements leaving substantially no projecting container material extending beyond the clamp elements, and directing heat at the thus sliced edges around the three edges of the container from points adjacent to but spaced from said edges to heat seal said edges.

5. The method of constructing a sealed container of cellular foam plastic which comprises folding the container about a median line to provide three remaining edges in abutting side-to-side relationship, which comprises clamping the side-to-side surfaces into tight surface contact with each other between a pair of highly heat-conductive clamp elements, slicing the edges of the container back to the edges of the clamp elements leaving substantially no projecting container material extending beyond the clamp elements, and directing a flame against the thus sliced edges from adjacent thereto but spaced therefrom to heat seal said edges.

6. The method of claim 1 wherein the plastic is a substantially rigid cellular polystyrene foam.

7. The method of claim 2 wherein the plastic is a substantially rigid cellular polystyrene foam.

8. The method of claim 3 wherein the plastic is a substantially rigid cellular polystyrene foam.

References Cited

UNITED STATES PATENTS

| 3,264,160 | 8/1966 | Donofrio | 156—306 |
|---|---|---|---|
| 3,282,766 | 11/1966 | Wright | 156—499 |
| 3,009,851 | 11/1961 | Madsen | 156—159 |
| 2,722,719 | 11/1955 | Altstadter. | |
| 3,054,679 | 9/1962 | Bradford | 229—2.5 XR |

PHILIP DIER, Primary Examiner.

U.S. Cl. X.R.

53—39; 156—159, 217, 227, 258, 306; 229—2.5, 48